April 18, 1950 W. C. TRAUTMAN 2,504,470
RELIEF VALVE
Filed June 18, 1945
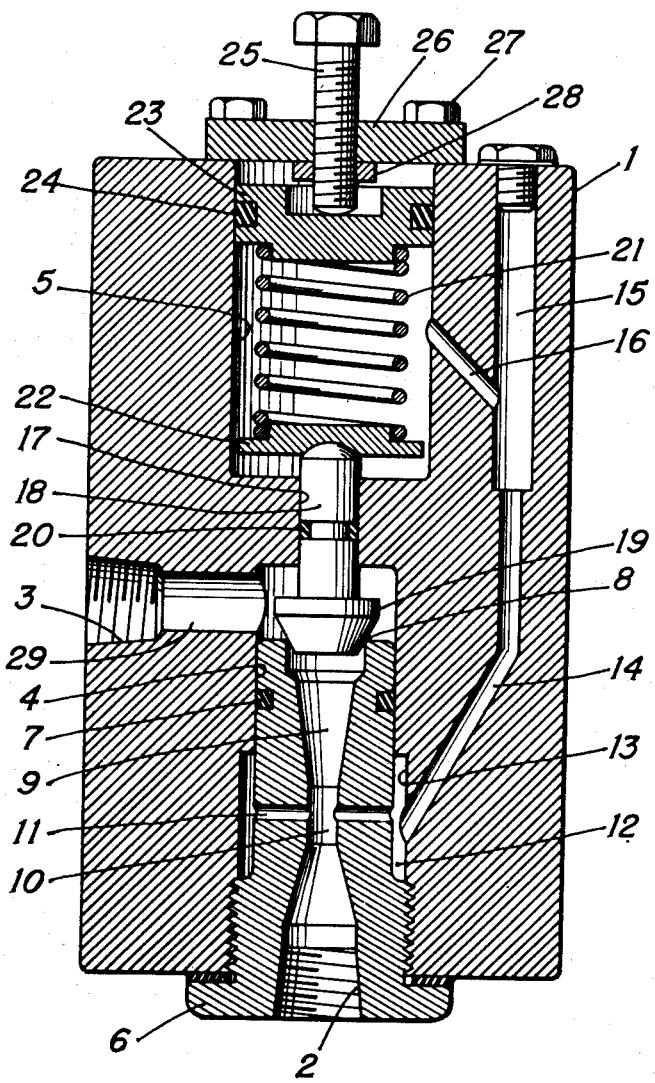
INVENTOR.
W. C. TRAUTMAN
BY
E. Woodbury
ATTORNEY Patented Apr. 18, 1950

2,504,470

UNITED STATES PATENT OFFICE 2,504,470

RELIEF VALVE

Walter C. Trautman, Los Angeles, Calif., assignor to Bendix Aviation Corporation, South Bend, Ind., a corporation of Delaware Application June 18, 1945, Serial No. 600,184

3 Claims. (Cl. 137—53)

This invention relates to relief valves and particularly to relief valves for use in hydraulic power systems.

An object of the invention is to reduce the range between the pressure at which a relief valve begins to open and the pressure at which it is fully opened.

A more specific object is to compensate at least in part for the increased force exerted by the loading spring of a relief valve as the valve opens.

Still another object is to reduce the stiffness of the loading spring in a relief valve.

A conventional relief valve consists of a poppet valve held against its seat by a loading spring so proportioned as to permit the poppet to be lifted off its seat when the pressure applied to the poppet is sufficient to overcome the force of the spring. In such a valve the force exerted against the poppet by the pressure fluid is directly proportional to the area of the seat, and it is desirable to use a large seat in order that the valve be capable of handling a substantial flow of fluid. Therefore, in the conventional construction, if the valve is to open only in response to relatively high pressure, a very stiff loading spring must be employed. Furthermore, unless the whole valve structure is made excessively large the spring will be so short relative to its stiffness that it will have a very high spring rate, i. e. the force exerted by the spring will be much greater when the valve is fully open than when it is closed. A high spring rate is objectionable in a relief valve because considerably greater pressure is required to open the valve wide than to merely crack it, with the result that the pressure in the system varies excessively with variation in rate of flow of fluid through the relief valve.

In accordance with the present invention, the foregoing defects are at least in part eliminated by applying pressure to an auxiliary rear face on the poppet from the throat of a Venturi passage in the relief valve ahead of the poppet. The rear face is of smaller dimension than the valve seat, and the opening force exerted on the poppet by the pressure fluid is equal to the difference between the area of the seat and the area of the rear face, which differential area can be made as small as may be desired to permit the use of a light spring having a relatively small spring rate as compared to the spring rate of a stiffer spring having the same length. The additional pressure required to fully open the valve is reduced because of the reduction in the spring rate. The magnitude of the additional pressure required to fully open the valve is further reduced by the Venturi passage, since as the rate of fluid flow through the valve increases, the pressure at the throat of the venturi is reduced, and the pressure aiding the spring is reduced.

A full understanding of the invention and the manner in which the foregoing together with other more specific objects and features of the invention are obtained will be apparent from the following detailed description of a preferred embodiment of the invention as illustrated in the drawing.

The single figure of the drawing is a longitudinal section through a relief valve incorporating the invention.

Referring to the drawing, the valve there depicted comprises a body 1 having a fluid inlet port 2 adapted to be connected to a pressure line and an outlet port 3 through which fluid bypassed through the valve is discharged.

The body contains a pair of coaxial bores, 4 and 5, respectively, extending thereinto from opposite ends. The bore 4 is closed by a draft tube 6 which is screwed into the body and contains a passage the outer end of which constitutes the inlet port 2. The draft tube 6 is closely fitted to the bore 4 and is sealed with respect thereto by a sealing ring 7. The inner end of the draft tube defines a valve seat 8 which is connected to the inlet port 2 by a Venturi passage 9 extending through the draft tube. The throat 10 of the Venturi passage is connected by radial passages 11 to an annular space 12 defined by the draft tube and an enlarged counterbore 13 in the body. The annular space 12 is connected by drilled passages 14, 15 and 16 to the bore 5, so that the pressure existing in the throat 10 of the Venturi passage is always applied to the bore 5.

The bores 4 and 5 are interconnected by a smaller bore 17 through which stem 18 of a poppet valve 19 extends and the stem 18 is sealed with respect to the bore 17 by a sealing ring 20.

The poppet 19 is normally held against the seat 8 by a helical loading spring 21, which is compressed between a disc 22, resting on the upper end of the stem 18, and a plug 23, which is closely fitted in the bore 5 and sealed with respect thereto by a sealing ring 24. An adjusting screw 25, threaded through a closure plate 26, secured to the body 1 by screws 27, takes the thrust exerted on the plug 23 by the spring 21, and permits adjustment of the vertical position of the plug 23, to vary the loading on the spring. A lock nut 28 on the underside of the plate 26 is provided to permit locking the adjusting screw 25 in a desired position.

The outlet port 3 is connected by a radial passage 29 to the upper end of the bore 4 above the draft tube 6, so that, when the poppet 19 opens, fluid flows through the valve from the inlet port 2 to the outlet port 3.

The valve operates the following:

The pressure of fluid in the system connected to the inlet port 2 is applied through the Venturi passage 9 to the underside of the poppet 19 and is also applied through the passages 11, 12, 14, 15, and 16 and through the bore 5 to the upper end of the poppet stem 18. The resultant force tending to lift the poppet off its seat 8 is proportional to the difference between the areas of the seat 8 and the stem 18 respectively, and it is only this force that has to be overcome by the spring 21. The differential area can be made as small as desired by increasing the diameter of the stem 18, without decreasing the diameter of the seat 8. Accordingly, a light loading spring can be employed while still retaining a large seat diameter to provide a large maximum flow rate.

The poppet 19 will begin to open at a definite pressure, hereinafter referred to as the "cracking pressure," and will open wider and wider at the pressure continues to rise.

As soon as fluid begins to flow through the Venturi passage 9, the pressure is reduced at the throat 10 of the venturi, relative to the pressure at the seat 8, and this reduced pressure is, of course, applied to the upper end of the stem 18. This reduces the force tending to close the poppet, and causes it to open wider than it otherwise would, so that a lower pressure in the inlet port 2 is required to fully open the poppet 19 than would be required if the pressure applied to the upper end of the stem 18 were always the same as the pressure applied to the poppet.

However, when the pressure in the inlet port 2 is reduced, the reduction in the rate of flow causes a corresponding reduction of the pressure differential between the throat of the venturi and the valve seat 8, so that the inlet pressure at which the valve finally closes is substantially the same as it would be if the passage through the draft tube 6 were straight instead of having a Venturi shape.

Although the constriction of the passage 9 necessary to define the reduced throat 10 produces a pressure drop between the inlet port 2 and the seat 8, it is found in practice that this pressure drop is more than compensated for by the increased opening of the poppet 19 resulting from the use of the Venturi passage, so that a net advantage is obtained by the use of the Venturi passage.

Although for the purpose of explaining the invention a preferred embodiment thereof has been described in detail, various departures from the exact construction shown can be made without departing from the invention, which is to be limited only to the extent set forth in the appended claims.

I claim:

1. A relief valve comprising: a body having inlet and outlet ports and a passage between said ports, a reciprocal valve interposed in said passage between said ports and normally blocking fluid flow therebetween, said valve having a pressure face exposed to fluid in said inlet port urging the valve toward open position and having a second opposite face of lesser area responsive to pressure thereagainst to urge said valve toward closed position; spring means urging said valve into closed position in opposition to the fluid force exerted against said first face; and means defining a Venturi passage between said inlet port and said valve, and means connecting the throat of said venturi to said second face on said valve.

2. A relief valve comprising: a body having an inlet port and an outlet port, said body defining a chamber connected to said outlet port and defining a Venturi passage having a reduced throat interconnecting said inlet port with said chamber through a valve seat in the wall of said chamber; a poppet valve in said chamber adapted to seat against said valve seat; said body defining a spring chamber, and a cylindrical passage of lesser diameter than said seat interconnecting said poppet chamber and said spring chamber, said poppet having an actuating stem extending into said spring chamber through the said cylindrical passage and having sealing engagement with said cylindrical passage; means including a loading spring in said spring chamber for applying a force to said stem to urge said poppet against said seat; and passage means in said body interconnecting the throat of the venturi and said spring chamber.

3. A relief valve comprising: a body member having axial bores extending thereinto from opposite ends; a draft tube extending into one of said bores and defining a poppet chamber in the inner end of said one bore, said draft tube having a Venturi passage therein the outer end of which passage constitutes an inlet port and the inner end of which constitutes a valve seat; means defining an outlet port connected to said poppet chamber; an axial cylindrical passage of lesser diameter than said seat interconnecting said two bores; a poppet valve in said poppet chamber having a stem in sealing engagement with said cylinder passage and extending therethrough into the other of said bores; an adjustable piston member in said other bore in sealing relation therewith; spring means in said other bore interposed between said valve stem and said piston member; means for adjustably supporting said piston member against the thrust of said spring means; and passage means in said body connecting the throat of said Venturi passage with said other bore at a point interior of said piston member therein.

WALTER C. TRAUTMAN.

REFERENCES CITED

The following references are of record in the file of this patent:

UNITED STATES PATENTS

| Number | Name | Date |
|---|---|---|
| 455,853 | Shepard | July 14, 1891 |
| 514,394 | Van Everen et al. | Feb. 6, 1894 |
| 1,735,117 | Kiger | Nov. 12, 1929 |
| 1,950,121 | McKee | Mar. 6, 1934 |
| 2,069,645 | Cardew | Feb. 2, 1937 |
| 2,372,631 | Stevenson | Mar. 27, 1945 |

FOREIGN PATENTS

| Number | Country | Date |
|---|---|---|
| 17,896 | Great Britain | Aug. 5, 1911 |
| 67,227 | Austria | Dec. 10, 1914 |